United States Patent
Paolo

(10) Patent No.: US 6,293,350 B1
(45) Date of Patent: *Sep. 25, 2001

(54) TRIMMER/CUTTER ATTACHMENT FOR LANDSCAPING TRIMMERS

(75) Inventor: David A. Paolo, Tampa, FL (US)

(73) Assignee: Lawn Laser, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/518,938

(22) Filed: Mar. 6, 2000

Related U.S. Application Data

(63) Continuation-in-part of application No. 08/970,746, filed on Nov. 15, 1997, now Pat. No. 6,032,442, which is a continuation-in-part of application No. 08/566,989, filed on Dec. 4, 1995, now abandoned.

(51) Int. Cl.[7] .................................................. A01B 33/06
(52) U.S. Cl. ................................ 172/15; 172/25; 172/41; 56/12.2; 56/13.6; 30/276
(58) Field of Search .................................... 56/12.2, 13.6; 172/13, 15, 17, 16, 25, 41; 30/276

(56) References Cited

U.S. PATENT DOCUMENTS

| | | | |
|---|---|---|---|
| 3,150,720 | 9/1964 | Hartnett | 172/16 |
| 4,062,115 | 12/1977 | Lee | 30/276 |
| 4,213,504 | 7/1980 | Schneider | 172/25 |
| 4,238,866 | 12/1980 | Taylor | 12/23 |
| 4,509,701 | 4/1985 | Jack et al. | 241/292 |
| 4,685,279 | 8/1987 | Gullett | 56/12.7 |
| 4,860,451 | 8/1989 | Pilatowicz et al. | 20/276 |

*Primary Examiner*—H. Shackelford
(74) *Attorney, Agent, or Firm*—Pettis & Van Royen, P.A.

(57) ABSTRACT

An attachment to replace existing landscaping trimmer heads and for mounting on new trimmers. The attachment includes specific structure for trimming grasses and weeds as well as structure for the removal of weeds unwanted grasses and unwanted shallow roots. The structure includes at least one pre-cut flexible trimming line that extends through the body member and a tapered bit member attached to the body member. The trimming line cuts and trims grasses and weeds and the tapered bit member has structure attached thereto for removal of weeds, unwanted grasses and unwanted shallow roots.

9 Claims, 5 Drawing Sheets

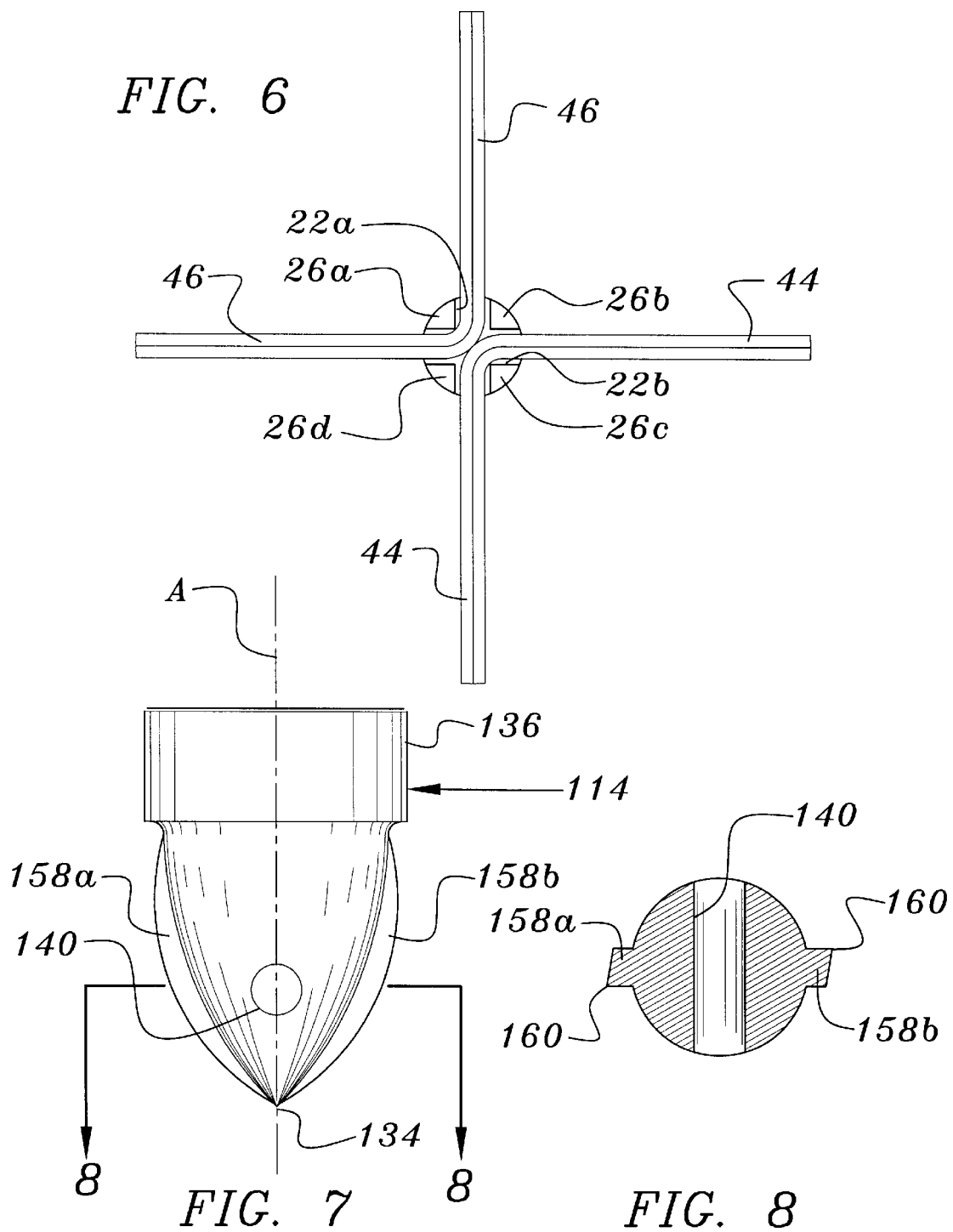

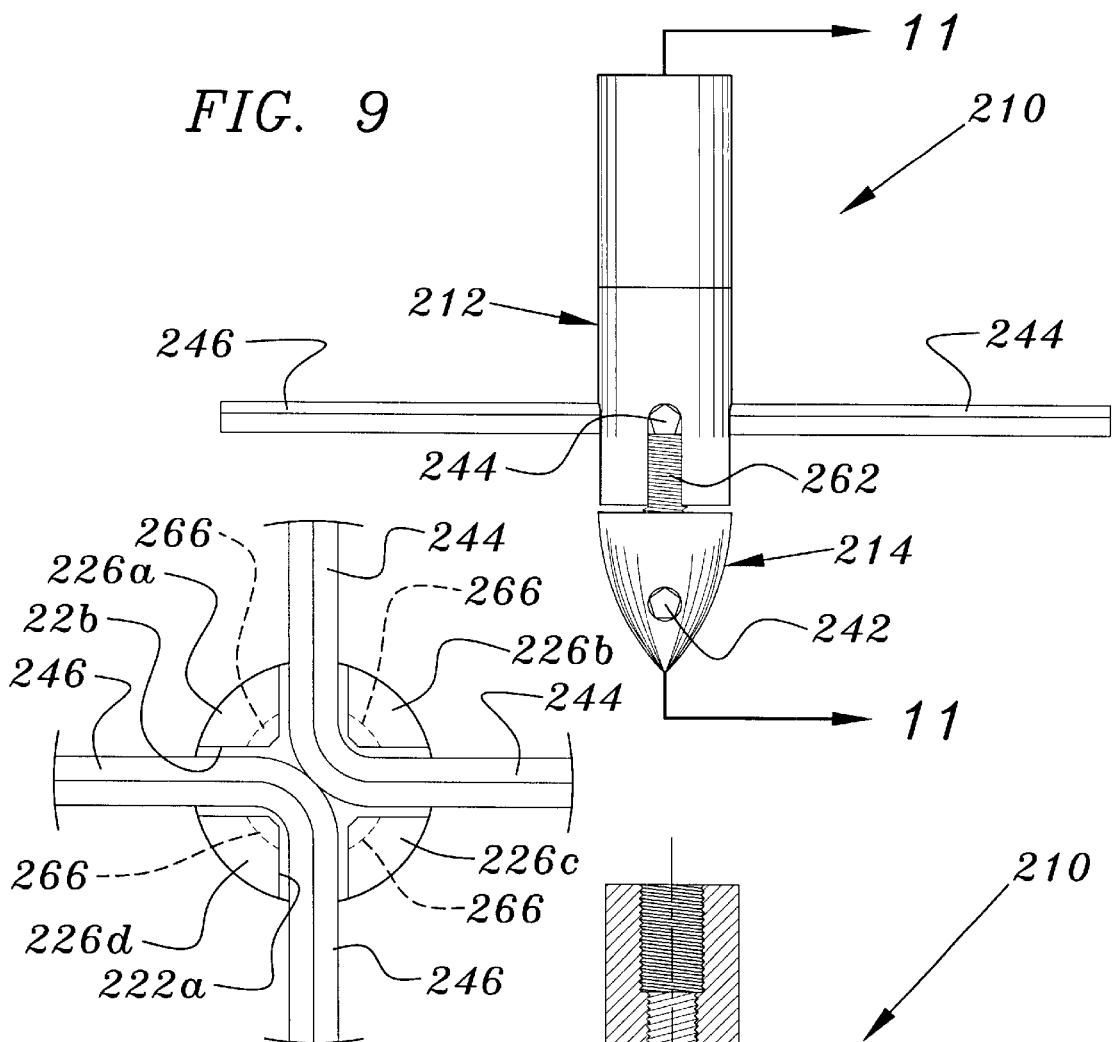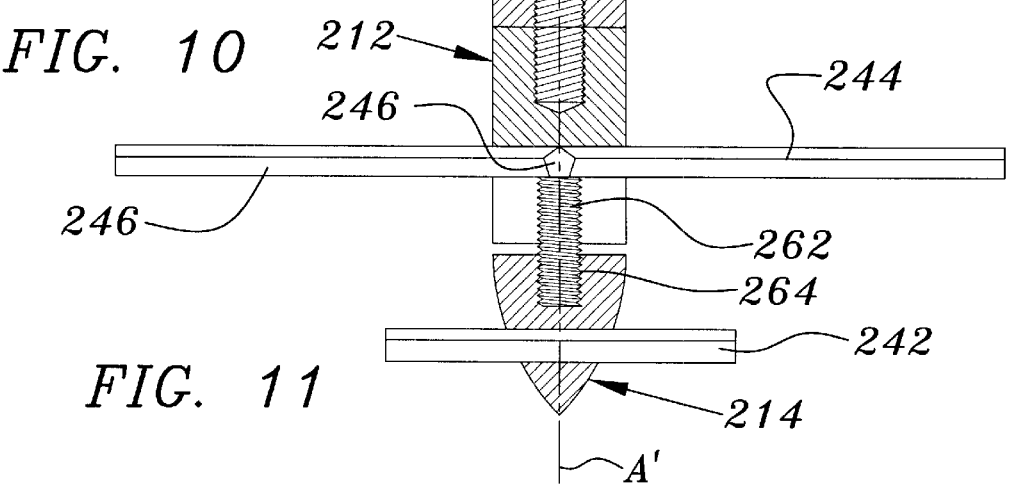

US 6,293,350 B1

TRIMMER/CUTTER ATTACHMENT FOR LANDSCAPING TRIMMERS

This application is a Continuation-in-part of current U.S. patent application Ser. No. 08/970,746 filed on Nov. 15, 1997 U.S. Pat. No. 6,032,442, which is a Continuation-in-part of U.S. patent application Ser. No. 08/566,989 filed on Dec. 4, 1995 now abandoned.

BACKGROUND OF THE INVENTION

1. Field of the Invention

The present invention relates to a trimmer/cutter attachment designed to replace trimmer/cutters on currently existing landscaping trimmers or for original installation on new landscaping trimmers. The trimmer/cutter attachment when mounted on a lawn trimmer efficiently trims or edges grasses and/or weeds, and is particularly adapted for removal of weeds, unwanted grasses and unwanted shallow roots in and around flower beds, planters, and rock gardens, as well as in flower pots and in flower boxes.

2. Description of the Prior Art

Landscaping trimmers, that use mono filament line to cut grass and weeds in areas where it is impractical or impossible to use lawn mowers, are well-known. They are used to edge around trees, near fences and walls and along borders of landscaped areas. Conventional landscaping trimmers have elongated shafts with a rotating element proximal the ground surface to which is attached a spool of monofilament line. This line is automatically fed from the spool by centrifugal force when the mono filament line is released by tapping a release button on the ground. As the ends of the mono filament line are worn and become shorter the operator taps the release button to lengthen the monofilament line for more efficient cutting. To meet other landscaping needs, the rotating spool that is attached to the trimmer may be replaced by other attachments, such as those having rigid blades.

The current attachments to landscaping trimmers have a number of disadvantages. Those attachments using spools to dispense a continuous supply of monofilament line tend to bind, jam, break and thus refuse to automatically feed monofilament line from the spool. This requires the operator to shut off the trimmer and make repairs, which slows the trimming and frustrates the operator. In addition, the operator is unable to do precision cutting as the monofilament line is constantly changing its length through wear and imprecise lengthening of the line. This causes the operator to frequently cut into plants, trees, walls, landscaping trim, and fences. Ihe rate of wear of the exposed monofilament line depends on the type of vegetation being cut and the number of times the user has inadvertently cut into a fence or a wall. Also, the amount of new monofilament line extended from the spool each time it is tapped on the ground depends upon the number of times the spool was tapped on the ground, and the possibility of the monofilament line binding and jamming within the spool without the operator being aware. As a result, when edging around a garden, a tree or a landscaped area, and operator is not always able to correctly anticipate the correct cutting radius of the trimmer. Frequently when wear of the monofilament line is rapid or the line breaks, the line will retract within the spool requiring the operator to disassemble the attachment and re-extend the line.

These well-known attachments are unable to remove weeds, unwanted grass and shallow roots from flower beds, rock gardens, planters, flower boxes and from around shrubbery. This requires the operator to interrupt the trimming operation and obtain different tools for weed and root removal.

Notwithstanding the existence of such prior art trimmer attachments, it remains clear that there is a need for a trimmer attachment that will trim precisely and at the same time will be able to remove weeds, unwanted grasses and shallow roots.

SUMMARY OF THE INVENTION

The present invention relates to a trimmer/cutter attachment designed to replace trimmer/cutters on currently existing landscaping trimmers or for installation on new landscaping trimmers. The present invention provides a means for increased precision during cutting of grasses and weeds, particularly around trees, fence posts and other obstructions. The invention may also be used to remove weeds, unwanted grasses and shallow roots.

Most simply stated the trimmer/cutter attachment comprises a body member having a first end and a second end. The body member has at least one open slot formed in the second end so that the open end is generally coincident with the second end of the body member. The first end of a tapered bit member is attachable to the second end of the body member. The tapered bit member has a cutting means attached thereto that extends outwardly from the tapered bit member. A pre-cut piece of flexible trimming line extends through the open slot in the body member. The body member has a connection means attached to the first end of the body member for attachment to a landscaping trimmer.

The invention accordingly comprises an article of manufacturer possessing the features, properties and the relation to elements that will be exemplified in the article hereinafter described. The scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 6 is a detailed bottom plan view of the invention of FIG. 1 with the tapered bit member removed for clarity;

FIG. 7 is a detailed front elevational view of a second embodiment of the tapered bit member.

FIG. 8 is a cross sectional view of the second embodiment of the tapered bit member taken along line 8—8 of FIG. 7;

FIG. 9 is a front elevational view of a second embodiment of the body member;

FIG. 10 is a detailed bottom plan view of the body member of FIG. 9 with the tapered bit member removed; and FIG. 11 is a cross sectional view of the second embodiment of the body member taken along line 11—11 of FIG. 9.

Similar reference numbers refer to similar parts throughout the several views of the drawings. These reference numbers are incremented by 100 to indicate similar parts in additional embodiments.

DESCRIPTION OF A PREFERRED EMBODIMENT

Figure 2:
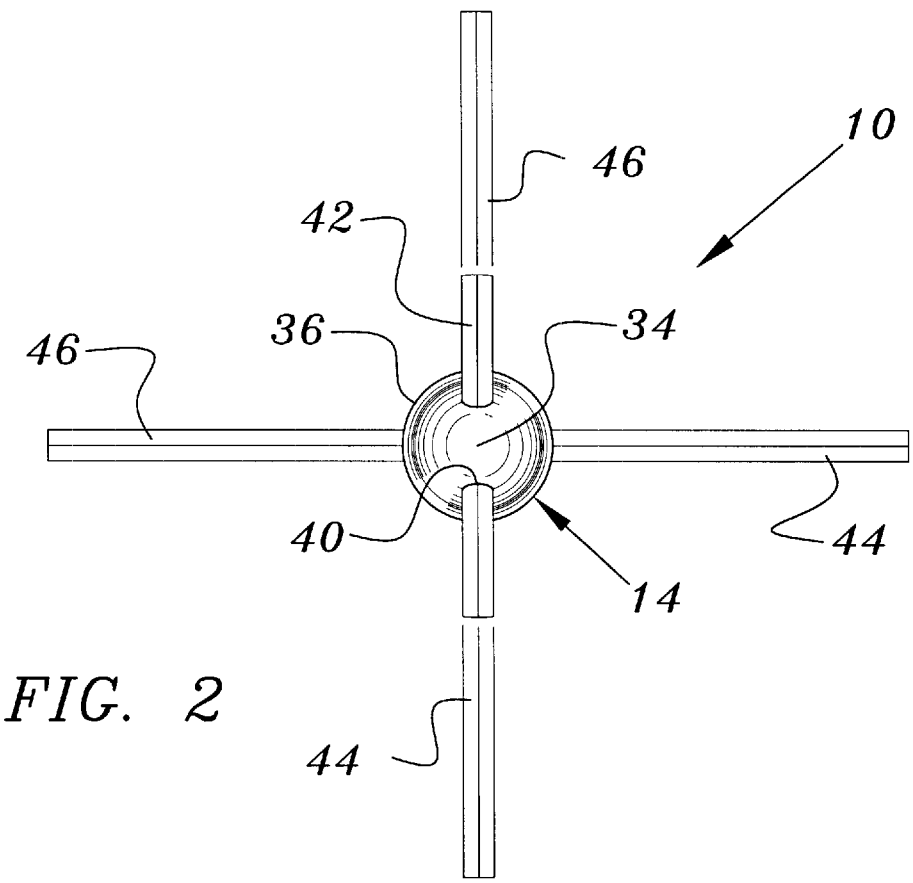
FIG. 2 is a bottom plan view of the invention of FIG. 1.
Figure 3:
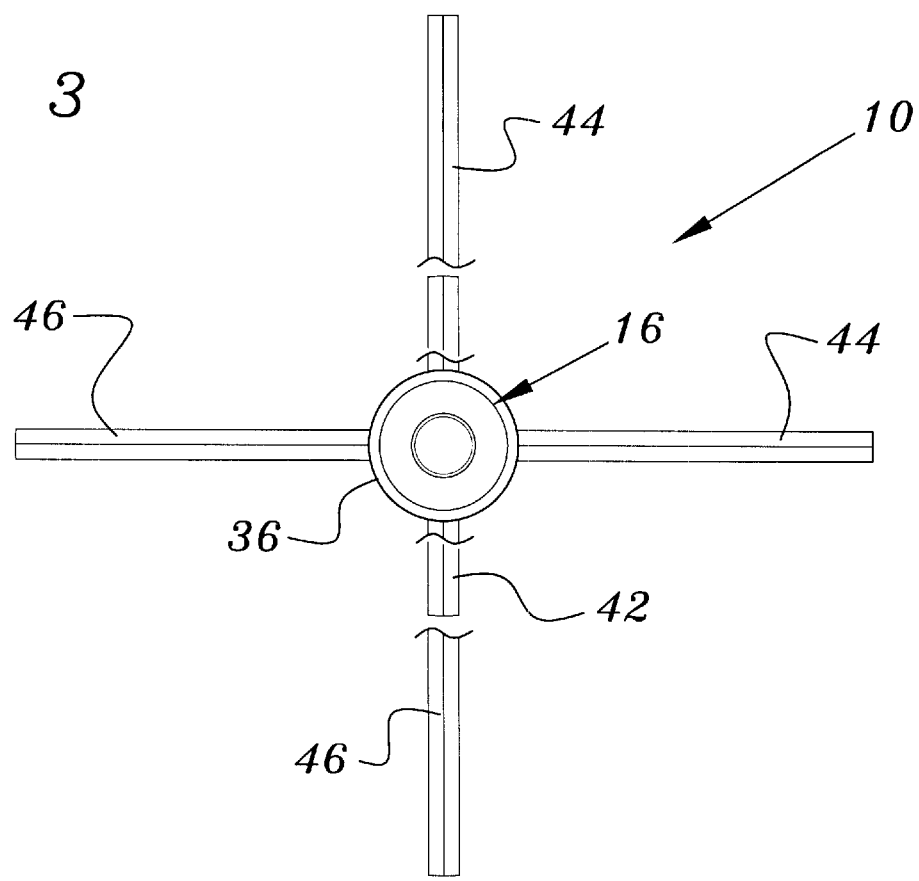
FIG. 3 is a top plan view of the invention of FIG. 1.

A preferred embodiment of the attachment for a landscaping trimmer of this invention is illustrated in the drawing figures. The attachment is generally indicated as 10 in the views of FIGS. 1–5. Referring first to the views of FIGS. 1, 2 and 3, it can be seen that the attachment 10 comprises a body member, shown generally as 12, a tapered bit member, shown generally as 14, and a connection means, shown generally as 16.

The body member 12 is generally cylindrical, however the cylindrical shape is not critical to the present invention as it may be formed with a plurality of sides (not shown), and function in the same manner. The cylindrical shape is selected as a preferred embodiment as it is economical to produce; however, a configuration that is a square or a hexagon will provide surfaces that may be gripped by wrenches for ease of attachment or removal of the attachment 10 from a landscaping trimmer. The body member 12 has a first end 18 and a second end 20. As more clearly seen in FIG. 5 and FIG. 6 the second end 20 of the body member 12 has a pair of open ended slots 22a and 22b formed therein. The open end of the slots 22a and 22b are coincident with the second end 20 of the body member 12. In other embodiments a single slot 22a or a plurality of slots may be formed therein. The embodiment having a pair of open-ended slots 22a and 22b that is illustrated will be the one discussed, however embodiments with one slot or three or more slots will operate in much the same manner. In a preferred embodiment, the bottoms of the slots 22a and 22b respectively, are curved, the bottom of slot 22a being designated as 24 in FIG. 5. The slots 22a and 22b are generally at right angles to one another; however in other embodiments the angular relationship may be different. The slots 22a–b form four posts 26a–d. Threads 28 are formed on the exterior surface 30 of the second end 20 of the body member 12.

Figure 4:
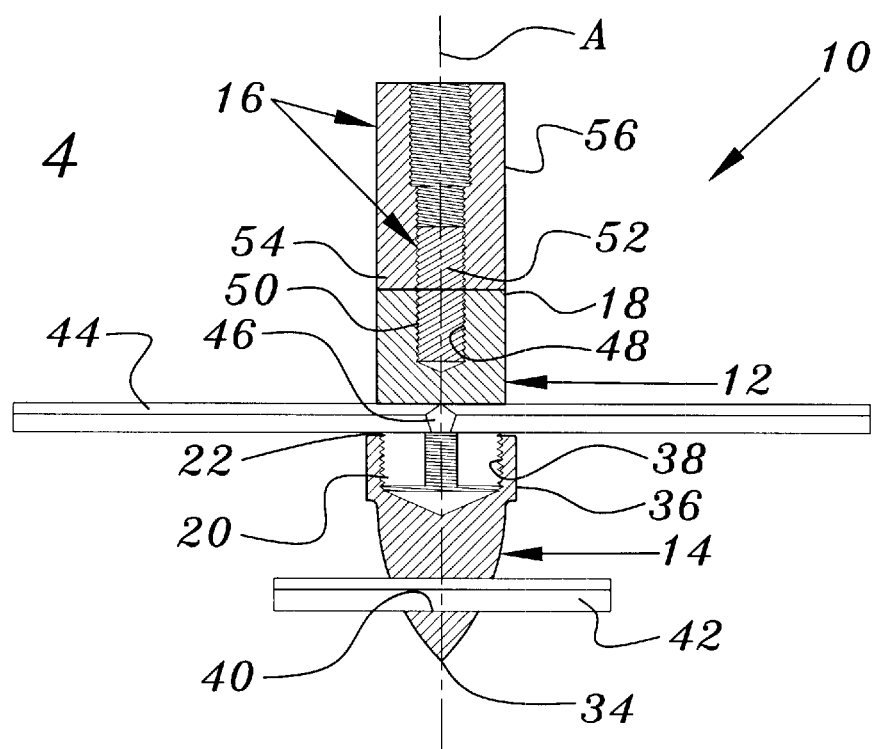
FIG. 4 is a cross sectional view taken along line 4—4.
Figure 5:
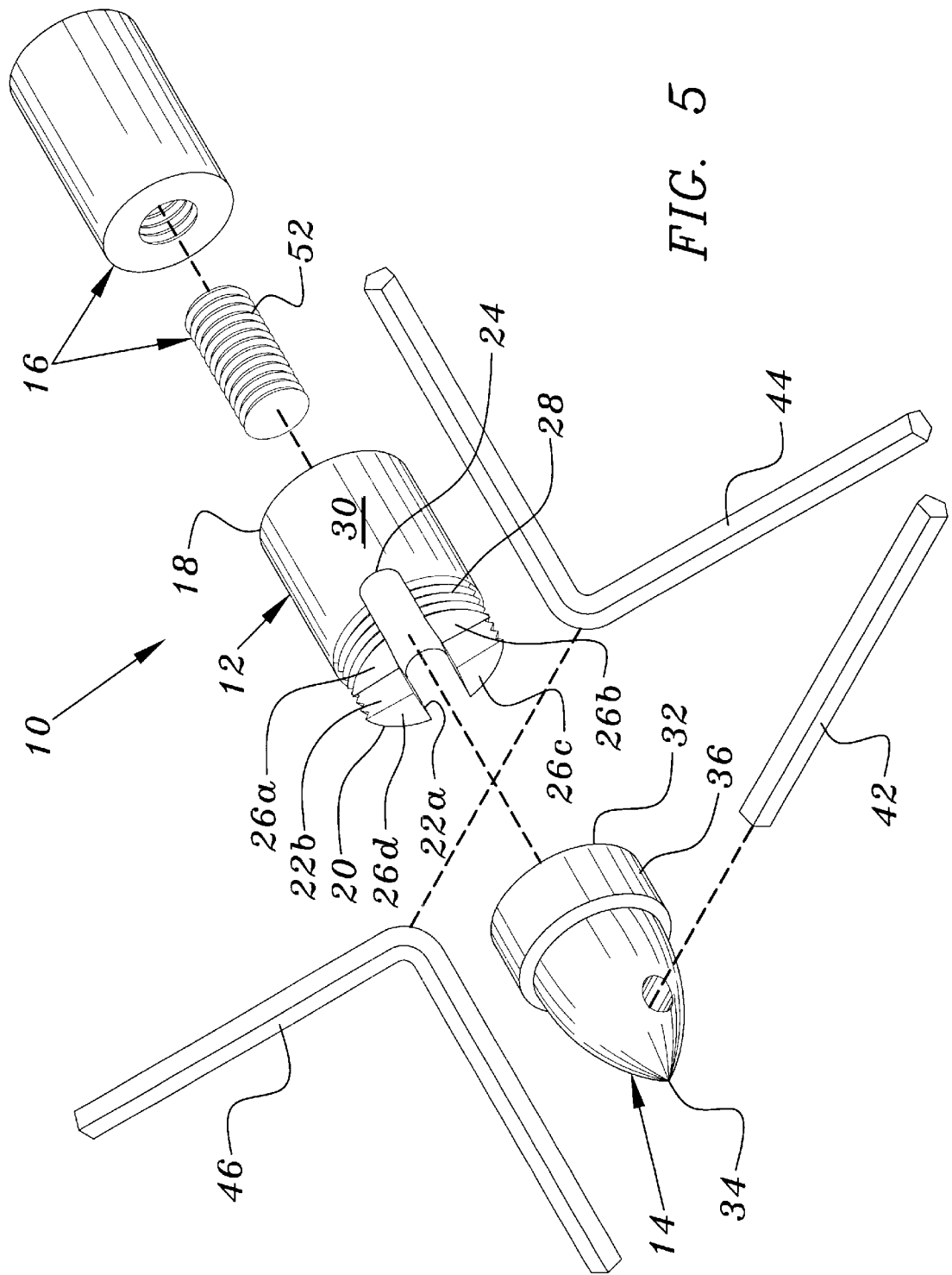
FIG. 5 is an exploded isometric view of the invention of FIG. 1.

The tapered bit member 14 has a first end 32 and a second end 34. The first end 32 of the tapered bit member 14 is attachable to the second end 20 of the body member 12. In a preferred embodiment, a collar 36 is formed proximal to the second end 32 of the tapered bit member 14. As seen in FIG. 4. the interior of the collar 36 has threads 38 formed thereon, which are threadably compatible with the threads 28 formed on the second end 20 of the body member 12. for attachment of the tapered bit member 14 to the body member 12. The tapered bit member 14 also comprises a cutting means formed thereon. In a preferred embodiment, the cutting means comprises a bore 40 that extends through the tapered bit member 14. The bore 40 is proximal the second end 34 and is generally perpendicular to the longitudinal axis A of the attachment 10. The cutting means further comprises a pre-cut piece of flexible trimming line 42 having a circumference that is sized larger than the bore 40 creating a friction fit. This piece of trimming line 42 is relatively short, being, in a preferred embodiment, preferably two to three inches long.

Figure 1:
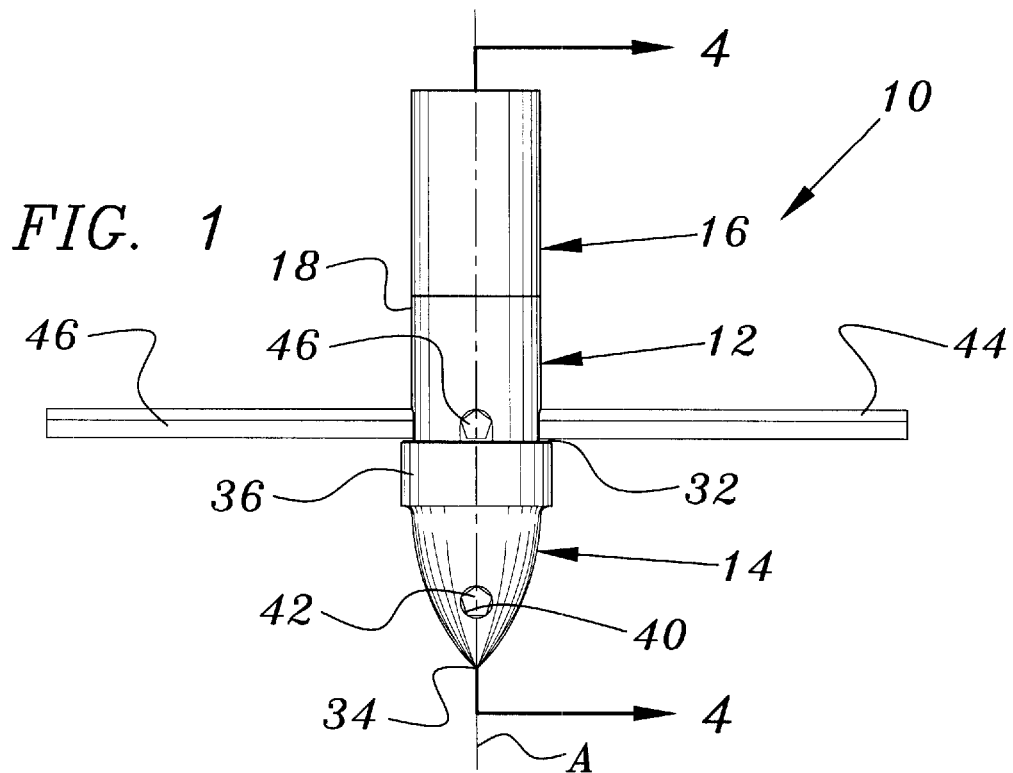
FIG. 1 is a front elevational view of the attachment of this invention.

At least one pre-cut piece of flexible trimming line extends through one of the slots. In a preferred embodiment, as shown in FIG. 1, two pre-cut pieces of flexible trimming line are used. A first pre-cut piece of flexible trimming line 44 and a second pre-cut piece of flexible trimming line 46 are passed through the slots 22a–b. As seen in FIG. 6 the first flexible trimming line 44 is inserted in slot 22a bent around one of the posts conveniently 26b and out slot 22b. The second flexible trimming line 46 is passed through slot 22b bent around the opposing post 26d and out slot 22a. The slots 22a–b, the body member 12 and the trimming lines 44 and 46 are so sized that when the trimming lines are inserted in the slots they engage one another and lie generally in the same plane. By being tightly fit within the slots and being wrapped around the posts, the trimming lines are held firmly in the body member 12. In other embodiments, the flexible trimming line may extend directly through the slots with one of the trimming lines lying above and resting upon the other. This may result in uneven cutting as the trimming lines are not rotating at the same level and the trimming lines will not be held as snugly within the body member 12. With the trimming lines 44 and 46 installed in the body member 12 so that they lie in the same plane, and the tapered bit member 14 is attached to the body member 12, the collar 36 will engage the trimming lines 44 and 46 providing additional means for holding the trimming lines tightly within the body member 12. The cross section of the trimming line may be round, square, star shaped, or have any other suitable cross-section. The size of the line is not critical, but in a preferred embodiment, the trimming line may have a diameter in the range of 0.065 inches to 0.155 inches, and its length will range from 2 to 12 inches, depending upon the particular use intended. If the trimming lines 44 and 46 are made longer than 12 inches they have a tendency to wrap around the body member 12.

The connection means 16 comprises several parts. As best seen in FIG. 4, the first end 18 of the body member 12 has a bore 48 that is centered on the longitudinal axis A of the apparatus 10 and extends inwardly from the first end 18. The bore 48 has threads 50 formed therein. This threaded bore 48 is sized to be mounted upon those landscaping trimmers having a threaded drive shaft (not shown) for mounting trimmer/cutter attachments. If instead the landscaping trimmer has a threaded bore (not shown) for receipt of a trimmer/cutter attachment, a fully threaded stud 52 is threaded into the bore 48 so that it extends outwardly therefrom and is used to mount the attachment 10 to the bore in the landscaping trimmer. If the landscaping trimmer has a threaded drive shaft that is larger than the bore 48, the first end 54 of an adapter 56 may be threadably mounted upon the stud 52. The second end of the adapter 56 may be bored and threaded for receipt of a larger threaded drive shaft. There are many other methods that may be used to mount the trimmer/cutter attachment to a landscaping trimmer, but this will depend upon the mounting means available for any particular landscaping trimmer. For example, if a landscaping trimmer has an unthreaded post, a clamping device may be attached to the body member 12 and clamped to the post for mounting the attachment 10.

In FIG. 7, a second embodiment of the tapered bit member 14 is shown as 114. In this embodiment the cutting means comprises at least one blade 158a that extends outwardly from the tapered bit member 114. In a preferred embodiment, a single blade 158a extends longitudinally along the tapered bit member 14 and is generally parallel to the longitudinal axis A of the attachment 10. In a preferred embodiment, as shown in FIG. 8, a first blade 158a and a second blade 158b are formed on opposing sides of the tapered bit member 114. Each blade has a sharpened edge 160. In the embodiment illustrated, the blades are generally straight, however in other embodiments the blade may have a screw type configuration extending from the first end 134 of the tapered bit member 114 around the tapered bit member 114 toward the collar 136 and ending proximal thereto. In another preferred embodiment, the cutting edge 160 may be serrated.

FIGS. 9–11 illustrate a second embodiment of the body member 12 and the tapered bit member 14, which are indicated as 212 and 214 respectively. In this embodiment, a threaded stud 262 is threadably mounted within a threaded bore 264 formed in the tapered bit member 214. The stud is attached to the tapered bit member 214 so that it extends along the longitudinal axis A' of the attachment 210. The stud 262 may be attached to the tapered bit member 214 by welding or other suitable means. As seen in FIG. 10, threads 266 are formed on the interior portion of each post 226a–d. The threads on the stud 262 are received by the threads formed on the posts, thereby attaching the tapered bit member 214 to the body member 212. In a preferred embodiment, the stud 262 is sufficiently long to engage the flexible trimming lines 244 and 246, holding the trimming lines within the attachment 210. In other embodiments, the stud 262 may be shorter leaving a gap between the stud 262 and the trimming lines 244 and 246 so that the trimming lines are held by their bend about the posts 226a–d, their tight fit in the slots 222a–b and their juxtaposition with one another. The collar 36 used for attaching the tapered bit member 14 to the body member 12 is not necessary in this embodiment and has therefore been excluded, otherwise most of the structure remains the same as the structure of attachment 10.

In a preferred embodiment, the attachments 10,110 and 210. are constructed primarily from steel for strength and wear purposes. However, in other embodiments various suitable plastics, such as polypropylene, may be used in place of one or more of the steel parts. The trimming lines 42, 44 and 46 must be flexible, strong and durable to perform their cutting functions and may be constructed from monofilament plastic line, flexible steel line, or other line suitable for the purpose.

Having thus set forth a preferred construction for the current invention, is to the remembered that this is but the preferred embodiment. Attention is now invited to a description of the use of the attachment 10. The original head of a landscaping trimmer (not shown) is removed and the attachment 10 is mounted in its place by the appropriate connection means, as previously discussed. Pieces of trimming line 44 and 46 that are from 6 to 12 inches long are inserted in the slots 22a–b and then the tapered bit member 14 is threaded onto the body member 12 and tightened until the collar 36 engages the trimming lines 44 and 46. The landscaping trimmer with the attachment 10 mounted thereon is now ready for trimming grasses and edging in open areas and other areas that mowers can not reach. In this configuration it can also be used to trim weeds that are too tall for a mower to handle. Trimming line 44 and 46 that is sized between 5 and 6 inches in length may be used for trimming around sprinkler heads and near plants and fences. Trimming line 44 and 46 that is sized between 2 and 3 inches in length may be used for trimming in flower beds and in other tight places. To prepare the attachment 10 for weeding a short piece of line 42 is inserted within the bore 40 and the trimming lines 44 and 46 are shortened so that when they are inserted within the slots 22a and 22b they each extend outwardly from the body member 12 from ⅛ th to ½ an inch. To remove weeds, the attachment 10 is placed above and slightly in front of a weed. A quick downward motion penetrating approximately one inch into the soil will drill out a weed and most of its roots. Pieces of the weed and its roots are fanned away by the air circulation created by the rotation of the trimming lines 44 and 46. Covering the one inch hole in a lawn is usually not necessary as the hole aerates the soil. To weed in flower pots and other tight places the trimming lines 44 and 46 are removed. When the weeds are particularly hardy, or the ground is firm, the tapered bit member 114 is used with the blades 158a and 158b effectively chopping the weeds and roots. This embodiment may also be used to loosen the soil.

While the foregoing describes particularly preferred embodiments of the present invention, providing unique structure, it is to be understood that numerous variations and modifications of the structure will occur to those skilled in the art. Accordingly, the foregoing description is to be considered illustrative only of the principles of this invention and is not to be considered limiting thereof, the scope of the invention being determined solely by the claims appended hereto.

What is claimed is:

1. An attachment for a landscaping trimmer comprising:
   a body member having a first end and a second end said body member having at least one open ended slot formed therein, said open end of said slot being coincident with said second end of said body member;
   a tapered bit member having a first end and a second end, said first end being attachable to said second end of said body member;
   at least one cutting means extending outwardly from said tapered bit member;
   a pre-cut piece of flexible trimming line extending through said slot in said body member; and
   connection means attached to said body member, whereby said attachment is attachable to a landscaping trimmer.

2. An attachment as in claim 1, wherein when said tapered bit member is attached to said second end of said body member said tapered bit member engages said flexible trimming line extending through said slot, whereby said trimming line is held in said slot.

3. An attachment as in claim 1 wherein said tapered bit member further comprises a bore therethrough, and said cutting means comprises a pre-cut piece of flexible trimming line extending through said bore of said bit member.

4. An attachment as in claim 1 wherein said cutting means comprises a blade formed on said tapered bit member, said blade extending outwardly therefrom.

5. An attachment as in claim 4 wherein said blade extends longitudinally generally parallel with the longitudinal axis of said tapered bit member.

6. An attachment as in claim 1, wherein said tapered bit member further comprises a collar formed on said first end of said body member, said collar threadably receiving said second end of said body member.

7. An attachment as in claim 1, having two slots formed therein at generally right angles to one another forming four posts in the second end of said body member and two pre-cut pieces of flexible trimming line extending through said slots such that one piece bends about one of said posts and the other one of said two pieces bends about an opposing post.

8. An attachment as in claim 7, wherein portions of said two pieces of flexible trimming line that are proximal said body member generally lie in the same plane.

9. An attachment as in claim 7, said tapered bit member further comprising a threaded stud attached to said first end of said tapered bit member such that the longitudinal axis of said stud generally coincides with the longitudinal axis of said tapered bit member and said body member, said threads of said stud being received by internal threads formed on said posts.

* * * * *